(12) United States Patent
Koike et al.

(10) Patent No.: US 6,989,405 B2
(45) Date of Patent: Jan. 24, 2006

(54) RESINOUS FILTER FOR INK-JET RECORDING APPARATUS

(75) Inventors: Hisashi Koike, Nagano (JP); Satoshi Shinada, Nagano (JP); Michinari Tsukahara, Nagano (JP); Tomio Yokoyama, Nagano (JP); Ikuyoshi Ochiai, Nagano (JP); Hiroyuki Nishimura, Kanagawa (JP); Shinsuke Yamada, Kanagawa (JP)

(73) Assignees: Seiko Epson Corporation, Tokyo (JP); Inoac Corporation, Aichi (JP)

( * ) Notice: Subject to any disclaimer, the term of this patent is extended or adjusted under 35 U.S.C. 154(b) by 343 days.

(21) Appl. No.: 10/214,178

(22) Filed: Aug. 8, 2002

(65) Prior Publication Data

US 2003/0052053 A1    Mar. 20, 2003

(30) Foreign Application Priority Data

Aug. 9, 2001  (JP) .......................... P.2001-242362

(51) Int. Cl.
*C08J 9/26* (2006.01)

(52) U.S. Cl. ........................................ 521/61; 264/249

(58) Field of Classification Search ................. 264/49; 521/61

See application file for complete search history.

(56) References Cited

U.S. PATENT DOCUMENTS

| | | | | |
|---|---|---|---|---|
| 4,256,845 A | * | 3/1981 | Morris et al. ................ 521/61 |
| 4,613,643 A | * | 9/1986 | Nakamura et al. .......... 524/426 |
| 4,791,144 A | * | 12/1988 | Nagou et al. ................ 521/90 |
| 5,185,111 A | | 2/1993 | Lazar | |

FOREIGN PATENT DOCUMENTS

JP          55-131028       * 10/1980

* cited by examiner

*Primary Examiner*—Allan R. Kuhns
(74) *Attorney, Agent, or Firm*—Sughrue Mion, PLLC

(57) ABSTRACT

Disclosed is a resinous filter for an ink-jet recording apparatus, which is obtained by a process comprising: adding common salt to a melt of a resin comprising at least one member selected from the group consisting of polyethylenes having a number-average molecular weight of from 30,000 to 80,000 and polypropylenes having a number-average molecular weight of from 50,000 to 100,000; kneading the resultant mixture to prepare a melt to be molded; molding the melt to be molded to obtain a molding; and washing the molding with water to remove the salt therefrom.

3 Claims, 2 Drawing Sheets

RESINOUS FILTER FOR INK-JET RECORDING APPARATUS

FIELD OF THE INVENTION

The present invention relates to a resinous filter for ink-jet recording apparatuses, which is disposed in an ink-jet recording apparatus in order to capture foreign matter which has come into an ink-jet recording ink.

BACKGROUND OF THE INVENTION

Ink-jet recording is a printing method in which an ink is ejected as small droplets from a fine nozzle to record characters or images on the surface of a recording material. The ink-jet recording techniques which have been put to practical use include: a technique in which electrical signals are converted to mechanical signals by means of an electrostrictive element to intermittently eject the ink residing in the nozzle head and thereby record characters or symbols on the surface of a recording material; and a technique in which the ink residing in the nozzle head is bubbled by rapidly heating that part of the ink which is located very close to the orifice to intermittently eject the ink by means of the volume increase due to the bubbles and thereby record characters or symbols on the surface of a recording material.

The ink which is ejected from the nozzle head in those techniques generally is one fed from an ink cartridge mounted on the ink-jet recording apparatus (printer). The ink cartridge housing contains an ink holding member, which is impregnated with the ink. The ink thus stored in the cartridge is discharged as the printer is used. Herein, particulate substances which are physically peeled off from the ink holding member are foreign matter for the ink and are causative of defects. Such defects include 1) the ink is not delivered in a desired amount and 2) printing is disturbed. To solve the defects, it is known an ink cartridge having a metal mesh disposed as a filter in the ink passage so as to capture foreign matter which has come into the ink-jet recording ink.

However, the use of a metal mesh has had a problem that it increases the production cost of an ink cartridge because the metal mesh has a high material cost and because it is necessary to fusion-bond the edge of the metal mesh to the inner wall of the ink passage in order to surely attach the metal mesh to the ink passage.

There has been another problem. Most of the members constituting an ink cartridge are usually made of a resin such as polypropylene. However, upon recycling such resin products, it is necessary to remove the metal mesh filter from the ink cartridge. Thus, ink cartridges employing a metal mesh filter have poor suitability for recycling.

SUMMARY OF THE INVENTION

The invention has been made in view of the problems described above, and hence an object of the invention is to provide a resinous filter for an ink-jet recording apparatus, which satisfies all of the following items 1) to 4):

1) it can be produced at low cost;
2) it can be easily disposed in an ink passage of an ink-jet recording apparatus (including an ink cartridge), thereby attaining a reduction in the production cost of the ink-jet recording apparatus;
3) it enables an ink-jet recording apparatus (including an ink cartridge) to have satisfactory suitability for recycling; and
4) it can surely capture foreign matter which has come into an ink-jet recording ink, while regulating the ink in an ink-jet recording apparatus so as to have a passage resistance suitable for ink-jet recording.

Other objects and effects of the present invention will become apparent from the following description.

The present inventors made extensive investigations in order to accomplish the objectives. As a result, they surprisingly found that when a resin obtained by a specific process is used as a filter, the objectives described above are accomplished. The invention has been achieved based on this finding.

That is, the above-described objectives have been achieved by providing a resinous filter for an ink-jet recording apparatus, which is obtained by a process comprising:

adding common salt to a melt of a resin comprising at least one member selected from the group consisting of polyethylenes having a number-average molecular weight of from 30,000 to 80,000 and polypropylenes having a number-average molecular weight of from 50,000 to 100,000;

kneading the resultant mixture to prepare a melt to be molded;

molding the melt to be molded to obtain a molding; and washing the molding with water to remove the salt therefrom.

In a preferred embodiment, the ratio of the amount of the resin to the amount of the common salt used in the process is from 4.5:95.5 to 9.5:90.5 by weight, and the common salt has a particle diameter of from 100 to 300 $\mu$m.

The particle diameter can be determined without depending on the kind of the resin serving as a matrix. However, the resin selected as a matrix, irrespective of whether it is a polyethylene or polypropylene, is preferably one which has heat resistance, flowability, and a melt viscosity so as to be suitable for the steps of kneading with common salt, molding, and subsequent salt extraction.

DETAILED DESCRIPTION OF THE INVENTION

Figure 1A:
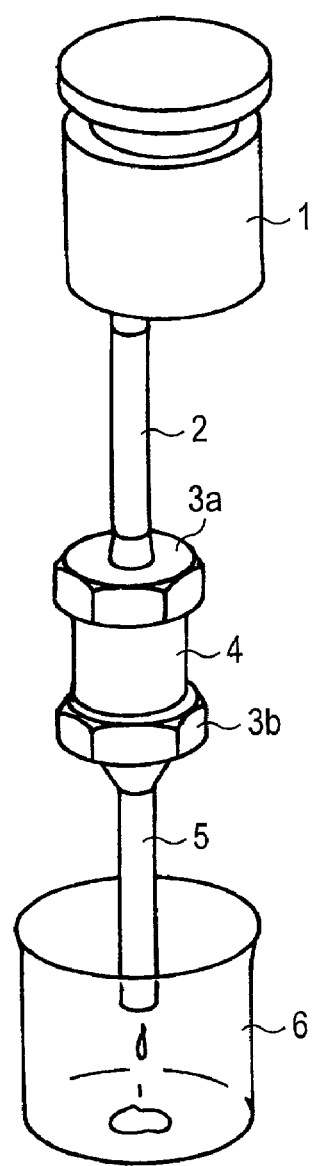
FIG. 1A is a view illustrating the whole of an apparatus for the foreign matter evaluation.

The resin constituting the resinous filter for ink-jet recording apparatuses (which may be referred to simply as "resinous filter") of the invention comprises at least one member selected from the group consisting of polyethylenes and polypropylenes.

The polyethylenes each have a number-average molecular weight of from 30,000 to 80,000. The polypropylenes each have a number-average molecular weight of from 50,000 to 100,000.

In case where a polyethylene or polypropylene having a molecular weight lower than that lower limit is used, the resinous filter is apt to release the constituting polyethylene or polypropylene upon contact with an ink and these particles come into the ink, making it impossible to accomplish the objectives of the invention.

On the other hand, in case where a polyethylene or polypropylene having a molecular weight higher than that upper limit is used, the resin has impaired moldability and a resinous filter is difficult to produce therefrom, making it impossible to accomplish the objectives of the invention.

The polyethylenes to be used in the invention can be known ethylene homopolymers. The polyethylenes may be those produced by any of the high-pressure process, medium-pressure process and low-pressure process, and any of low-density, medium-density and high-density polyethylenes may be used. However, a low-density polyethylene having a low crystallinity and a low softening temperature is preferred from the standpoints of kneading with common salt and the efficiency of extrusion molding. Such a polyethylene can be used as a mixture with a low-molecular polyethylene having a number-average molecular weight of 10,000 or lower or with a linear polyethylene.

The polypropylenes to be used in the invention can be known polypropylenes having a number-average molecular weight of 50,000 or higher. When a filter having a high porosity is to be formed by incorporating a large amount of common salt, it is especially preferred to use a propylene homopolymer because it has excellent flowability despite its relatively high melting point. The polypropylene may be a copolymer having a structural unit other than the propylene unit. With respect to the arrangement of structural units, the copolymer may be either a random copolymer or block copolymer. A preferred example thereof is an ethylene/propylene copolymer produced by copolymerizing propylene and ethylene.

A wide range of polyethylene resins and polypropylene resins which are generally used as materials for porous substances can be used as the polyethylenes and polypropylenes each having an average molecular weight within the range specified above. Commercial products of such resins are available. Examples thereof include Sumitomo PE 1700 (trade name), manufactured by Sumitomo Chemical Co., Ltd., and Tafmer A4090, manufactured by Mitsui Chemicals, Inc.

The resinous filter of the invention is produced in the following manner. First, common salt (NaCl) is added to a melt of the resin described above, and the resultant mixture is kneaded to prepare a melt to be molded. For the melting of the resin and subsequent molding, known melt molding techniques can be advantageously used.

The temperature at which the resin is melted depends on the number-average molecular weight of the resin. When a polyethylene having a number-average molecular weight of from 30,000 to 80,000 is used, the melting temperature is generally from 105 to 125° C. When a polypropylene having a number-average molecular weight of from 50,000 to 100,000 is used, the melting temperature is generally from 170 to 185° C.

The kneading of the resin melt with common salt may be conducted simultaneously with melt molding or separately from melt molding.

In the case where the kneading is conducted simultaneously with melt molding, resin pellets and common salt are suitably introduced into an extruder to knead and mold the mixture. Various extruders can be used. Examples thereof include single-screw extruders, multi-screw extruders represented by twin-screw extruders, vented extruders, plunger extruders, and gear pump extruders. In the case where the kneading and melt molding are conducted as separate steps, various known kneading machines can be used for the kneading. Examples thereof include mixing rolls, sigma-blade kneading machines, Banbury mixers, high-speed twin-screw continuous mixers, and extruder type kneading machines.

Subsequently, this melt to be molded is molded into a predetermined shape to thereby produce a molding. This molding is one obtained from the melt to be molded, which consists of a molten resin and particles of common salt dispersed therein. After the molding, the salt particles retain the dispersed state.

Finally, the obtained molding is washed with water to remove the salt therefrom. Thus, a resinous filter according to the invention can be obtained which has pores in the parts where the salt particles had been present. Although methods for washing the molding with water are not particularly limited, a technique generally used is to immerse the molding in water.

In this technique, the time necessary for salt extraction is regulated according to the thickness of the molding. For the purpose of heightening the efficiency of extraction, a technique capable of positively extracting the salt such as, e.g., calendering, manual squeezing, or ultrasonic irradiation by an ultrasonic cleaner may be used in combination with the immersion step.

This resinous filter can be produced at a lower cost than the aforementioned metal mesh filter because the cost of the resin and common salt used as the raw materials is low and a general melt molding technique can be used.

Furthermore, the resinous filter of the invention has elasticity because of the pores dispersedly present therein. Consequently, when the resinous filter is formed so as to have a slightly larger volume than that space of an ink passage of an ink-jet recording apparatus into which the filter is to be disposed and this filter is inserted into the space, then the resinous filter can be easily and surely disposed in the ink passage of the ink-jet recording apparatus. Thus, the production cost of an ink-jet recording apparatus can be reduced.

Moreover, the resinous filter can be regulated with respect to ink passage resistance in an ink-jet recording apparatus and the ability to capture foreign matter, by changing the "resin/common salt weight ratio" and the "particle diameter of the common salt" in preparing the melt to be molded. These factors are appropriately selected according to the kinds of the ink and ink-jet recording apparatus to be used, etc.

Specifically, the effects of changing the resin/common salt weight ratio are as follows. As the proportion by weight of the common salt increases, the porosity of the resinous filter increases and the ink passage resistance hence decreases. Conversely, as the proportion by weight of the resin increases, the porosity of the resinous filter decreases and the ink passage resistance hence increases.

On the other hand, as the particle diameter of the salt decreases, the diameter of the pores dispersedly present in the filter becomes smaller. Although a smaller pore diameter brings about the higher ability to capture foreign matter, it is causative of an increase in ink passage resistance. Conversely, as the particle diameter of the salt increases, the diameter of the pores dispersedly present in the filter becomes larger. Although a larger pore diameter results in a decrease in the ability to capture foreign matter, it brings about reduced ink passage resistance.

It should, however, be noted that a feature of the resinous filter resides in high moldability (high degree of freedom of design). Because of this, design modifications can be made highly freely. For example, when the passage resistance is high, the resinous filter can be made to have a reduced thickness or increased area. When it is desired to enhance the ability to capture foreign matter, the filter thickness in the ink flow direction can be increased.

In the case of the known metal meshes, the only technique capable of coping with the desire to heighten the ability to capture foreign matter is to employ a finer metal mesh. However, since this technique unavoidably results in increased passage resistance, there have frequently been cases where such fine metal mesh filters cannot be used as filters for ink-jet recording. In contrast, with the resinous filter of the invention, more three-dimensional capture of foreign matter is made possible by increasing the filter thickness in the ink flow direction as stated above. Consequently, the ability to capture foreign matter can be heightened without excessively increasing the passage resistance.

In the ink-jet recording technique in which ink droplets are successively ejected at short time intervals, it is advantageous to operate the recording apparatus under such conditions that foreign matter is surely captured by the filter without excessively heightening the ink passage resistance. In view of the relationships described above, the "resin/common salt weight ratio" and the "particle diameter of the common salt" are suitably determined. The resin/common salt weight ratio and the particle diameter of the common salt are preferably from 4.5:95.5 to 9.5:90.5 and from 100 to 300 $\mu$m, respectively, although they depend on the shape of the resinous filter.

In case where the resin proportion is smaller than the resin/common salt weight ratio of 4.5:95.5, then the resin ingredient serving as a matrix has reduced strength. As a result, a porous substance is not formed and the molded article is less apt to retain its filter shape after salt extraction. In addition, the resultant filter is less apt to surely capture foreign matter. On the other hand, in case where the resin proportion is larger than the resin/common salt weight ratio of 9.5:90.5, then the ink passage resistance increases and the resultant filter tends to have poor water permeability. In addition, the probability of the generation of foreign matter attributable to peeling off of resin particles from the filter becomes high.

The position in which the resinous filter of the invention, which has been described above in detail, is to be disposed is not particularly limited as long as it is in an ink-jet recording apparatus. However, it is preferred to dispose the filter at a location within the ink passage extending from the ink storage part of an ink-jet cartridge to the recording head, especially preferably in the ink passage within the ink-jet cartridge.

In this specification, the ink-jet cartridge is included by the ink-jet recording apparatus.

For example, in the case where the filter of the invention which is made of a polypropylene is disposed in an ink-jet cartridge made of a polypropylene, there is no need of removing the resinous filter upon recycling the ink cartridge. Thus, satisfactory suitability for recycling can be imparted to the ink cartridge.

EXAMPLES

The present invention will be illustrated in greater detail with reference to the following Examples and Comparative Examples, but the invention should not be construed as being limited thereto.

Example 1

A polyethylene resin (trade name, Sumitomo PE 1700; molecular weight, 30,000; manufactured by Sumitomo Chemical Co., Ltd.) and common salt (trade name, Naruto Yakishio; particle diameter, 150 $\mu$m; manufactured by Tomita Seiyaku K.K.) were introduced into an extrusion molding machine (trade name, Labo Plastomill; manufactured by Toyo Seiki, Ltd.) in a weight ratio of 7.0:93.0 and extrusion-molded into a rod shape having a diameter of 7 mm. This rod molding was immersed in tap water for 24 hours to extract the salt.

The porous substance resulting from the extraction was taken out of the water bath and allowed to stand for 1 day to dry it at ordinary temperature. The porous substance dried was cut into a filter shape having a predetermined thickness. Thus, the resinous filter of Example 1 was produced.

Examples 2 to 6 and Comparative Examples 1 to 4

The resinous filters of Examples 2 to 6 and Comparative Examples 1 to 4 were produced in the same manner as for the resinous filter of Example 1, except that resins having various number-average molecular weights were used as shown in Tables 1 and 2.

In Examples 2 and 3 and Comparative Examples 1 and 2, polyethylenes were used as the resin. In Examples 4 to 6 and Comparative Examples 3 and 4, polypropylenes were used as the resin. The common salt had a particle diameter of 150 $\mu$m. The resin/salt ratio was 7.0:93.0.

TABLE 1

|  | Comp. Ex. 1 | Ex. 1 | Ex. 2 | Ex. 3 | Comp. Ex. 2 |
|---|---|---|---|---|---|
| Number-average molecular weight of polyethylene | 24,000 | 30,000 | 50,000 | 80,000 | 90,000 |
| Number of foreign matter | 79 | 69 | 37 | 31 | 39 |
| Pressure loss (sec/10 cm$^3$) | 7.6 | 6.3 | 5.4 | 4.6 | 3.7 |
| Moldability | A | A | A | A | C |

TABLE 2

|  | Comp. Ex. 3 | Ex. 4 | Ex. 5 | Ex. 6 | Comp. Ex. 4 |
|---|---|---|---|---|---|
| Number-average molecular weight of polypropylene | 45,000 | 50,000 | 70,000 | 100,000 | 120,000 |
| Number of foreign matter | 77 | 71 | 42 | 39 | 39 |
| Pressure loss (sec/10 cm$^3$) | 6.2 | 5.7 | 4.6 | 3.9 | 3.1 |
| Moldability | A | A | A | A | C |

Examples 7 to 12 and Reference Examples 1 to 4

The resinous filters of Examples 7 to 12 and Reference Examples 1 to 4 were produced in the same manner as for the resinous filter of Example 1, except that the resin/salt weight ratio was varied as shown in Tables 3 and 4.

In Examples 7 to 9 and Reference Examples 1 and 2, a polyethylene having a number-average molecular weight of 60,000 was used as the resin. In Examples 10 to 12 and Reference Examples 3 and 4, a polypropylene having a number-average molecular weight of 80,000 was used as the resin. The common salt had a particle diameter of 150 $\mu$m.

TABLE 3

|  | Ref. Ex. 1 | Ex. 7 | Ex. 8 | Ex. 9 | Ref. Ex. 2 |
|---|---|---|---|---|---|
| Polyethylene (parts by weight) | 3.0 | 4.5 | 7.0 | 9.5 | 13.0 |
| Common salt (parts by weight) | 97.0 | 95.5 | 93.0 | 90.5 | 87.0 |
| Number of foreign matter | ND | 82 | 37 | 34 | 30 |
| Pressure loss (sec/10 cm$^3$) | ND | 2.5 | 5.4 | 6.5 | 9.5 |
| Moldability | C | B | A | A | A |

ND: unmeasurable

TABLE 4

|  | Ref. Ex. 3 | Ex. 10 | Ex. 11 | Ex. 12 | Ref. Ex. 4 |
|---|---|---|---|---|---|
| Polypropylene (parts by weight) | 3.0 | 4.5 | 7.0 | 9.5 | 13.0 |
| Common salt (parts by weight) | 97.0 | 95.5 | 93.0 | 90.5 | 87.0 |
| Number of foreign matter | ND | 91 | 42 | 40 | 32 |
| Pressure loss (sec/10 cm$^3$) | ND | 2.1 | 4.6 | 6.5 | 9.3 |
| Moldability | ND | B | A | A | A |

ND: unmeasurable

Examples 13 to 18 and Reference Examples 5 to 8

The resinous filters of Examples 13 to 18 and Reference Examples 5 to 8 were produced in the same manner as for the resinous filter of Example 1, except that the particle diameter of the common salt was varied as shown in Tables 5 and 6.

In Examples 13 to 15 and Reference Examples 5 and 6, a polyethylene having a number-average molecular weight of 60,000 was used as the resin. In Examples 16 to 18 and Reference Examples 7 and 8, a polypropylene having a number-average molecular weight of 80,000 was used as the resin.

TABLE 5

|  | Ref. Ex. 5 | Ex. 13 | Ex.14 | Ex. 15 | Ref. Ex. 6 |
|---|---|---|---|---|---|
| Particles diameter of common salt (μm) | 80 | 100 | 150 | 300 | 350 |
| Number of foreign matter | ND | 30 | 37 | 62 | 80 |
| Pressure loss (sec/10 cm$^3$) | ND | 5.9 | 5.4 | 3.0 | 2.6 |
| Moldability | C | A | A | A | A |

ND: unmeasurable

TABLE 6

|  | Ref. Ex. 7 | Ex. 16 | Ex. 17 | Ex. 18 | Ref. Ex. 8 |
|---|---|---|---|---|---|
| Particles diameter of common salt (μm) | 80 | 100 | 150 | 300 | 350 |
| Number of foreign matter | ND | 35 | 42 | 65 | 90 |
| Pressure loss (sec/10 cm$^3$) | ND | 5.2 | 4.6 | 2.6 | 2.4 |
| Moldability | ND | B | A | A | A |

ND: unmeasurable

Figure 1B:
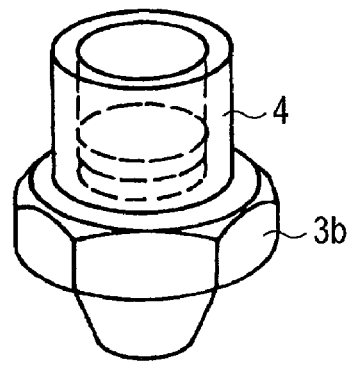
FIG. 1B is an enlarged slant view of a fixing jig and a fastening.

Evaluation for Foreign Matter:

Prepared is a vertically installed apparatus which comprises, as shown in FIG. 1A, a syringe 1, an incurrent tube 2, a fixing jig 4, metallic fastenings 3a and 3b, and an excurrent tube 5. A beaker 6 for collecting foreign matter is placed under the lower end of the apparatus. The syringe 1 has a capacity of 50 mL, and each tube has a length of 10 cm. The fixing jig 4 is a resinous hollow cylinder, as shown in FIG. 1B, having an inner diameter of 6.8 mm. A test piece having a thickness of 3 mm and a diameter of 7.2 mm is fitted tightly into the fixing jig 4, and the metallic fastenings 3a and 3b are attached to the upper and lower sides thereof.

The apparatus thus fabricated was used to evaluate the test piece for foreign matter by the following procedures.

1) First, 15 mL of a commercial ink fluid is introduced into the syringe 1 to fill the incurrent tube 2, i.e., the tube on the upstream side of the fixing jig, with the ink fluid.

2) A cylinder is inserted into the syringe 1 and the 15-mL ink fluid is extruded from the syringe 1 at a rate of 5 mL per 8 seconds and passed through the filter. As a result, the fluid into which foreign matter come is obtained in the collecting beaker 6.

3) A filter paper is set on a suction filter (glass holder type suction filtration kit XX KT047-1P, manufactured by Yamato Scientific Co., Ltd.), and a membrane filter (pore size, 10 μm; manufactured by Millipore Corp.) is placed at the center of the filter paper.

4) A 10-mL glass syringe is pressed against the membrane filter while evacuating the syringe with a vacuum pump.

5) Into the glass syringe is introduced 10 mL of the foreign matter-containing fluid which has been collected.

6) The vacuum pump is stopped, and foreign matter on the membrane filter is collected.

7) The membrane filter is placed on a slide glass and examined for foreign matter with an optical microscope of 50 magnifications. The number of foreign matter present in a predetermined area is counted.

Measurement of Pressure Loss

Figure 2A:
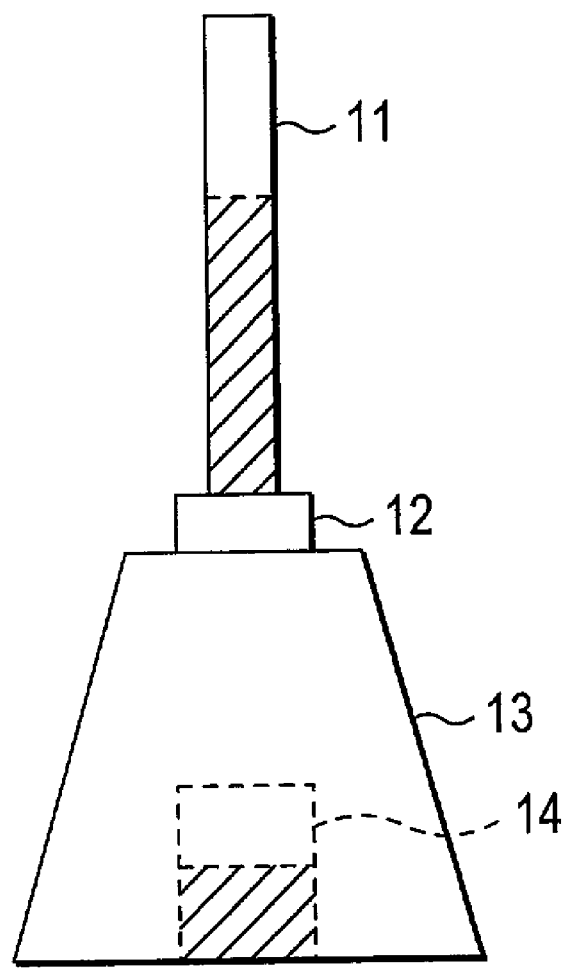
FIG. 2A is a diagrammatic view of an apparatus for measuring the pressure loss.

A cylindrical glass vessel 11, a metallic disk jig 12 having a through-hole in the center, a glass vessel 13 as a base, and a receiver 14 (e.g., beaker) for receiving methanol were prepared as shown in FIG. 2A. The cylindrical glass vessel 11 had a capacity of 50 mL, and was graduated from a lower part thereof so as to indicate the amount of contents. The diameter of the central hole of the metallic jig 12 is suitably changed according to the sample to be examined or to purposes.

Subsequently, pressure loss was measured by the following procedure.

1) First, a resinous filter as a sample to be examined is impregnated with methanol (first-grade reagent). This filter is placed in an atmosphere having a reduced pressure in order to forcedly fill the filter (up to the inside of the porous body) with the methanol. Thus, the air present in the filter is replaced with methanol.

2) The outer diameter and thickness of the filter are measured. This measurement is made up to the order of 1/100 mm.

Figure 2B:
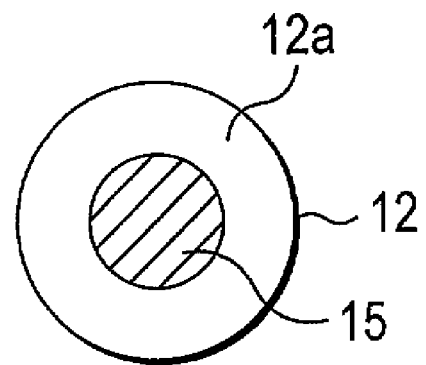
FIG. 2B illustrates a metallic disk jig viewed from an axial direction.

3) As shown in FIG. 2B, which illustrates the metallic disk jig 12 viewed from an axial direction, the filter 15 (thickness, 3 to 5 mm) which has been prepared in 1) and 2) above is fitted into the central hole of the metallic disk jig 12. This structure is placed on the base glass vessel 13 as shown in FIG. 2A. Furthermore, the cylindrical glass vessel 11 is placed on the metallic disk jig 12 so that the axis of the glass vessel 11 is vertical.

The fitted filter and the metallic disk jig 12 are in such a state that both the disk surface 12a of the jig 12 and the upper side of the filter 15 are horizontal.

The receiver 14 for receiving methanol has been disposed in the base glass vessel 13 under the metallic disk jig 12 to which the filter has been fitted.

4) About 50 mL of methanol (first-grade reagent) is poured into the glass vessel 11, and the time period required for the methanol amount in the glass vessel 11 to decrease from 40 mL to 30 mL is measured with a stopwatch. Pressure loss is evaluated in terms of this time period. The methanol which has flowed out is recovered with the receiver 14, e.g., a beaker.

5) The measurement is conducted three or more times and the found values are averaged to thereby determine the pressure loss.

Evaluation of Moldability

Moldability was evaluated based on a visual examination of the appearance of the filter produced through 24-hour water extraction of each resin/common salt mixture obtained through kneading. The mixtures which could be satisfactorily molded are indicated by "A", those which could be molded but were slightly unsatisfactory in physical strength are indicated by "B", and those which gave a filter having too low physical strength to be examined with the apparatus for pressure loss measurement are indicated by "C".

From the results give above, the resinous filters of the Examples were ascertained to satisfy both of:

1) the number of foreign matter coming into the passed fluid is small; and 2) the pressure loss is 6.5 (sec/10 cm$^3$) or lower, giving an ink passage resistance suitable for ink-jet recording.

On the other hand, the resinous filters of Comparative Examples 1 and 3, which each had been formed from a resin having a molecular weight lower than the lower limit specified in the invention, were large in the number of foreign matter coming into the passed fluid. Furthermore, the resinous filters of Comparative Examples 2 and 4, which each had been formed from a resin having a molecular weight higher than the upper limit specified in the invention, were insufficient in moldability.

As described above, the invention can provide a resinous filter for an ink-jet recording apparatus which satisfies all of the following 1) to 4):

1) it can be produced at low cost;

2) it can be easily disposed in an ink passage of an ink-jet recording apparatus (including an ink cartridge), thereby attaining a reduction in the production cost of an ink-jet recording apparatus;

3) it enables an ink-jet recording apparatus (including an ink cartridge) to have satisfactory suitability for recycling; and 4) it can surely capture foreign matter which has come into the ink-jet recording ink, while regulating the ink in the ink-jet recording apparatus so as to have a passage resistance suitable for ink-jet recording.

Furthermore, use of the resinous filter has the following advantage. Ink-jet recording inks generally contain various solvents. However, the resinous filter of the invention for ink-jet recording apparatuses, which comprises a specific polyethylene resin or polypropylene resin, is free from the dissolution of the filter itself due to solvents, and is capable of inhibiting the ink itself from being deteriorated by filter dissolution.

While the invention has been described in detail and with reference to specific embodiments thereof, it will be apparent to one skilled in the art that various changes and modifications can be made therein without departing from the spirit and scope thereof.

What is claimed is:

1. A resinous filter for an ink-jet recording apparatus, which is obtained by a process comprising:

adding common salt to a melt of a resin comprising at least one member selected from the group consisting of polyethylenes having a number-average molecular weight of from 30,000 to 80,000 and polypropylenes having a number-average molecular weight of from 50,000 to 100,000;

kneading the resultant mixture to prepare a melt to be molded;

molding the melt to be molded to obtain a molding; and washing the molding with water to remove the salt therefrom;

wherein the ratio of the amount of the resin to the amount of the common salt used in the process is from 4.5:95.5 to 9.5:90.5 by weight, and the common salt has a particle diameter of from 100 to 300 µm.

2. The resinous filter according to claim 1, wherein the resinous filter is a molded article.

3. A resinous filter for an ink-jet recording apparatus, which is obtained by a process consisting of:

adding common salt to a melt of a resin comprising at least one member selected from the group consisting of polyethylenes having a number-average molecular weight of from 30,000 to 80,000 and polypropylenes having a number-average molecular weight of from 50,000 to 100,000;

kneading the resultant mixture to prepare a melt to be molded;

molding the melt to be molded to obtain a molding; and washing the molding with water to remove the salt therefrom;

wherein the ratio of the amount of the resin to the amount of the common salt used in the process is from 4.5:95.5 to 9.5:90.5 by weight, and the common salt has a particle diameter of from 100 to 300 µm.

* * * * *